United States Patent
Tseng et al.

(10) Patent No.: US 11,701,825 B2
(45) Date of Patent: Jul. 18, 2023

(54) THREE DIMENSIONAL PRINTING APPARATUS AND MANUFACTURING METHOD THEREOF

(71) Applicant: Young Optics Inc., Hsinchu (TW)

(72) Inventors: I-Chih Tseng, Hsinchu (TW); Ming-Feng Ho, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 466 days.

(21) Appl. No.: 16/830,273

(22) Filed: Mar. 26, 2020

(65) Prior Publication Data
US 2021/0197464 A1 Jul. 1, 2021

(30) Foreign Application Priority Data
Dec. 31, 2019 (TW) .................................. 108148747

(51) Int. Cl.
| | |
|---|---|
| *B29C 64/245* | (2017.01) |
| *B33Y 30/00* | (2015.01) |
| *B29C 64/135* | (2017.01) |
| *B29C 64/124* | (2017.01) |
| *B29C 64/264* | (2017.01) |

(52) U.S. Cl.
CPC .......... *B29C 64/245* (2017.08); *B29C 64/124* (2017.08); *B29C 64/135* (2017.08); *B29C 64/264* (2017.08); *B33Y 30/00* (2014.12)

(58) Field of Classification Search
CPC ..... B29C 64/20; B29C 64/245; B29C 64/264; B29C 64/124; B29C 64/129; B29C 64/135; B33Y 10/00; B33Y 30/00
See application file for complete search history.

(56) References Cited

U.S. PATENT DOCUMENTS

| | | | |
|---|---|---|---|
| 9,346,217 B2 | 5/2016 | Huang et al. | |
| 2017/0182716 A1* | 6/2017 | Wu | B29C 64/245 |
| 2017/0217089 A1* | 8/2017 | Batchelder | B33Y 30/00 |
| 2017/0297261 A1* | 10/2017 | Schultheiss | B33Y 30/00 |
| 2017/0305136 A1* | 10/2017 | Elsey | B29C 64/245 |
| 2020/0298485 A1* | 9/2020 | Tsai | B29C 64/245 |
| 2020/0307100 A1* | 10/2020 | Sabo | B29C 64/245 |
| 2021/0129439 A1* | 5/2021 | Korol | B29C 64/245 |

FOREIGN PATENT DOCUMENTS

| | | |
|---|---|---|
| TW | 201706114 | 2/2017 |
| TW | I632050 | 8/2018 |

* cited by examiner

*Primary Examiner* — Jerzi H Moreno Hernandez
(74) *Attorney, Agent, or Firm* — JCIPRNET

(57) ABSTRACT

A three dimensional printing apparatus including a carrying plate, a transparent plate, an elastic film, and a bump is provided. The transparent plate is disposed on the carrying plate. The elastic film is disposed on the transparent plate. The bump is disposed between the elastic film and the carrying plate. An interface between the transparent plate and the elastic film is in communication with an external space through a fluid channel between each bump and the elastic film. An orthographic projection area of the bump on the transparent plate is not more than ¼ of a surface area of the transparent plate.

17 Claims, 4 Drawing Sheets

THREE DIMENSIONAL PRINTING APPARATUS AND MANUFACTURING METHOD THEREOF

CROSS-REFERENCE TO RELATED APPLICATION

This application claims the priority benefit of Taiwan application serial no. 108148747, filed on Dec. 31, 2019. The entirety of the above-mentioned patent application is hereby incorporated by reference herein and made a part of this specification.

BACKGROUND

Technical Field

The disclosure relates to a three dimensional printing apparatus and a manufacturing method thereof, and in particular to a three dimensional printing apparatus having a vacuum relief or low pressure structure and a manufacturing method thereof.

Description of Related Art

In the conventional vat photopolymerization (VP) additive manufacturing (AM) equipment, the bottom of the tank for accommodating the curing resin has a release film and a glass plate supporting the release film. During the process of printing a workpiece, the curing resin is cured on a build platform after being irradiated by a projection light source, thereby forming one of the layers in the workpiece. In order to continue printing the next layer of the workpiece, the build platform is lifted upwards and an oblique force is applied to the contact point of the release film and the workpiece by the restoring force of the deformable release film, so that the film body is more easily detached from the workpiece. However, the space between the release film and the glass plate is a vacuum or low pressure space, so the release film is not able to be easily detached from the glass plate.

SUMMARY

The disclosure provides a three dimensional printing apparatus, which can break the vacuum or low pressure state between a release film and a glass plate.

The disclosure provides a manufacturing method of a three dimensional printing apparatus, which is used for manufacturing the three dimensional printing apparatus above.

A three dimensional printing apparatus according to an embodiment of the disclosure includes a carrying plate, a transparent plate, an elastic film, and a bump. The transparent plate is disposed on the carrying plate. The elastic film is disposed on the transparent plate. The bump is disposed between the elastic film and the carrying plate. An interface between the transparent plate and the elastic film is in communication with an external space through a fluid channel between the bump and the elastic film. An orthographic projection area of the bump on the transparent plate is not more than ¼ of the surface area of the transparent plate.

A three dimensional printing apparatus according to another embodiment of the disclosure includes a carrying plate, a glass plate, a release film, a spacer, and a projector. The glass plate is disposed on the carrying plate. The release film is disposed on the glass plate. The spacer is disposed between the release film and the carrying plate to push open the release film, so that there is a gap between the glass plate and the release film. A fluid is located between the release film and the glass plate through the gap. The projector is disposed on the upstream of the light path of the glass plate and is suitable for providing a light beam towards the glass plate, wherein the spacer is located outside the projection range of the projector.

Based on the above, in the design of the three dimensional printing apparatus according to the embodiments of the disclosure, the interface between the transparent plate and the elastic film may be in communication with the external space through the fluid channel between the bump and the elastic film. That is, the three dimensional printing apparatus according to the embodiments of the disclosure allows the external fluid to enter between the elastic film and the transparent plate by setting the bump, so as to break the vacuum or low pressure state between the elastic film and the transparent plate, so that the elastic film may be easily detached from the transparent plate.

To make the aforementioned and other features of the disclosure more comprehensible, several embodiments accompanied with drawings are described in detail as follows.

DETAILED DESCRIPTION OF DISCLOSED EMBODIMENTS

Figure 1A:
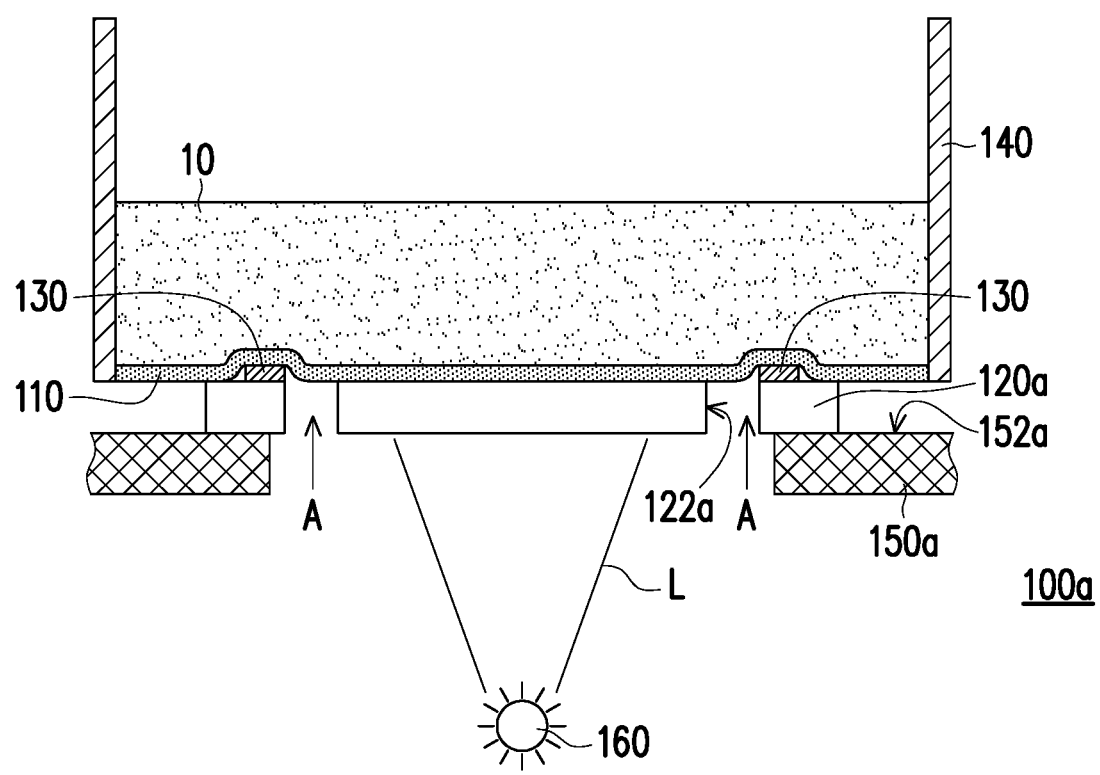
FIG. 1A is a schematic diagram of a three dimensional printing apparatus according to an embodiment of the disclosure.
Figure 1B:
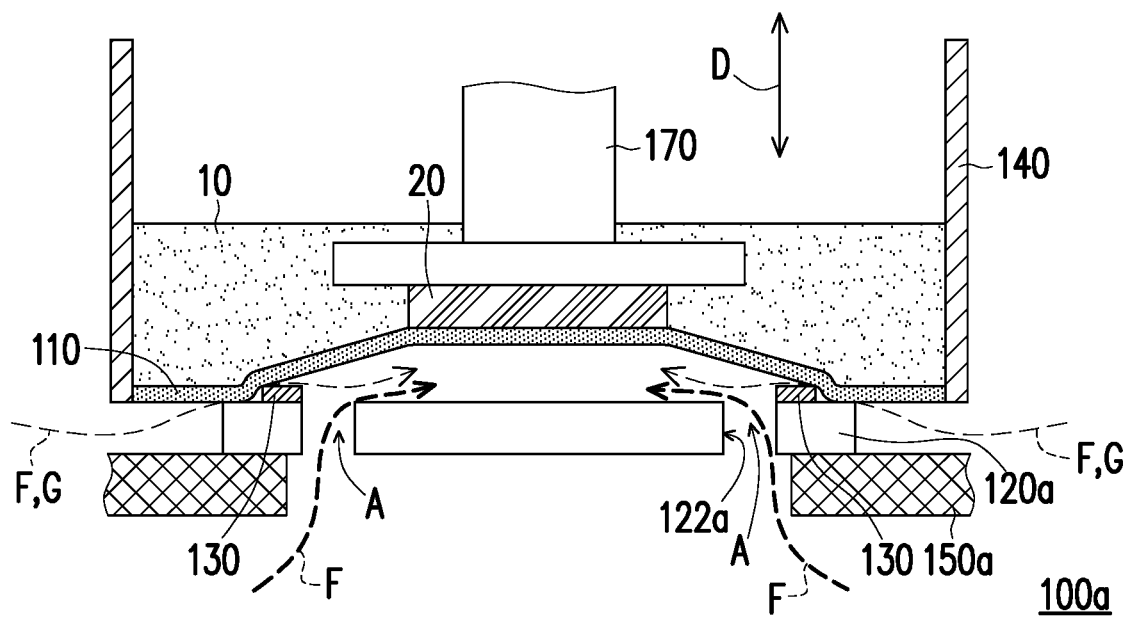
FIG. 1B is a schematic diagram of separating a workpiece in a tank of FIG. 1A from a release film.
Figure 1C:
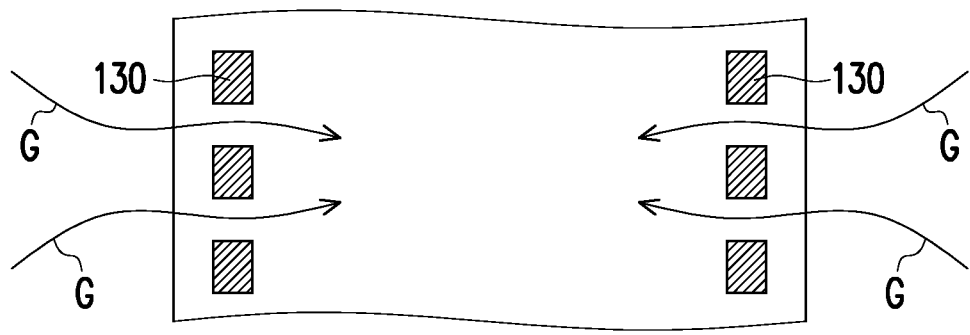
FIG. 1C is a schematic diagram of a gap and a bump between a glass plate and a release film.

FIG. 1A is a schematic diagram of a three dimensional printing apparatus according to an embodiment of the disclosure. FIG. 1B is a schematic diagram of separating a workpiece in a tank of FIG. 1A from a release film. FIG. 1C is a schematic diagram of a gap and a bump between a glass plate and a release film. For ease of explanation, FIG. 1C only schematically illustrates the positional relationship between the bump and the gap. Please refer to FIG. 1A, FIG. 1B, and FIG. 1C at the same time. In the embodiment, a three dimensional printing apparatus 100a includes a carrying plate 150a, a transparent plate, an elastic film, and a bump 130.

In detail, the transparent plate is disposed on the carrying plate 150a, wherein the transparent plate is a plate which allows specific light to pass through and has sufficient structural strength. In the embodiment, the transparent plate is made of a glass material with high ultraviolet light transmittance, that is, the transparent plate is a glass plate 120a in the embodiment. However, the material of the transparent plate is not limited to glass and may also be made of, for example, a molecular material with high light transmittance, such as resin or plastic. Here, the glass plate 120a is specifically disposed on a carrying surface 152a of the carrying plate 150a and the glass plate 120a has a plurality of vias 122a. There is an air space A between each of the vias 122a of the carrying plate 150a and the glass plate 120a.

The elastic film is disposed on the glass plate 120a, wherein the elastic film is a flexible film made of a soft material. The elastic film is transparent and allows visible or invisible light to pass through. Here, the elastic film is, for example, a release film 110. In an embodiment, the release film 110 also has, for example, a low surface adhesion characteristic. For example, the material of the release film 110 may be silicon rubber or polytetrafluoroethylene, but is not limited thereto. In another embodiment, the release film 110 may also be a Teflon film, which still belongs to the protected scope of the disclosure.

The bump includes a plurality of bumps separated from one another, wherein the bump is, for example, a spacer 130 disposed between the release film 110 and the glass plate 120a. Here, the spacer 130 is disposed on the glass plate 120a and is located between the glass plate 120a and the release film 110. An orthographic projection area of the spacer 130 on the glass plate 120a is not more than ¼ of the surface area of the glass plate 120a. In an embodiment, the spacer 130 may be made of an elastic material, such as polyethylene terephthalate (PET), urethane, etc. In another embodiment, the spacer 130 may also be made of a non-elastic material, such that the spacer 130 may be an aluminum plate or a steel plate, but is not limited thereto.

In particular, an interface between the glass plate 120a and the release film 110 of the embodiment is in communication with an external space through a fluid channel between each spacer 130 and the release film 110. Here, the spacer 130 may be set to push open the release film 110, so that there is a gap G between the glass plate 120a and the release film 110, and the gap G is a fluid channel. A fluid F may enter between the release film 110 and the glass plate 120a through the gap G and the air space A, thereby breaking the vacuum or low pressure phenomenon between the release film 110 and the glass plate 120a, so as to balance the pressure on both sides of the release film 110.

Furthermore, the three dimensional printing apparatus 100a of the embodiment further includes a tank 140 disposed on the glass plate 120a, and the release film 110 is located between the glass plate 120a and the tank 140. Herein, the release film 110 isolates the glass plate 120a and the tank 140. Here, the tank 140 is configured to accommodate a light-curable material 10, wherein the state of the light-curable material 10 may be liquid, colloidal, fluid, powder, etc., and the disclosure is not limited thereto. Due to material characteristics, the light-curable material 10 may form a workpiece 20 after being cured by light.

In addition, the three dimensional printing apparatus 100a of the embodiment further includes a projector 160, which is disposed on the upstream of the light path of the glass plate 120a and is suitable for providing a light beam L towards the glass plate 120a, wherein the spacer 130 is located outside the projection range of the projector 160. Here, the projector 160 is, for example, a digital light processing (DLP) projection element, a liquid crystal on silicon (LCOS) projection element, a liquid crystal projection element, a scanning laser projection element, etc. The light-emitting element adopted by the projector 160 may be a light emitting diode (LED), a laser, or other suitable light-emitting elements. It is worth mentioning that the wavelength range of the light provided by the light-emitting element needs to be in coordination with a liquid light-sensitive material.

In addition, the three dimensional printing apparatus 100a of the embodiment further includes a build platform 170 moving in a vertical direction D away from or close to the release film 110. Here, the build platform 170 and the glass plate 120a are disposed on opposite sides of the release film 110, the light-curable material 10 forms the workpiece 20 after being cured by light, and the workpiece 20 may be formed on the build platform 170 layer by layer.

In terms of application, please refer to FIG. 1A and FIG. 1B at the same time. After the light beam L provided by the projector 160 passes through the glass plate 120a and the release film 110, and irradiates the light-curable material 10, the light-curable material 10 forms the workpiece 20 after being cured and the workpiece 20 is attached onto the build platform 170. Next, the build platform 170 lifts the workpiece 20 upwards, so that the fluid F in the external space is located between the release film 110 and the glass plate 120a through the gap G and the air space A, thereby breaking the vacuum or low pressure phenomenon between the release film 110 and the glass plate 120a, so as to balance the pressure on both sides of the release film 110. The peeling force required to lift the workpiece 20 upwards only needs to overcome the adhesive force between the workpiece 20 and the release film 110 to separate the workpiece 20 from the release film 110, so that the light-curable material 10 is filled between the workpiece 20 and the release film 110. The printing procedure of the next layer is proceeded.

In short, the three dimensional printing apparatus 100a of the embodiment allows the external fluid F to enter between the release film 110 and the glass plate 120a by the design of setting the spacer 130 and the glass plate 120a to have the vias 122a, so as to break the vacuum or low pressure state between the release film 110 and the glass plate 120, so that the release film 110 may be easily detached from the glass plate 120a.

In terms of manufacture of the three dimensional printing apparatus 100a, the carrying plate 150a may be provided first. Next, the transparent plate (such as the glass plate 120a) and the bump (such as the spacer 130) are assembled on the carrying plate 150a. Then, the elastic film (such as the release film 110) is assembled on the transparent plate and the bump, wherein the interface between the transparent plate and the elastic film is in communication with the external space through the fluid channel (such as the gap G) between the bump and the elastic film, and the orthographic projection area of the bump on the transparent plate is not more than ¼ of the surface area of the transparent plate. At this point, the manufacture of the three dimensional printing apparatus 100a is completed.

It must be noted here that the following embodiments continue to use the reference numerals and some contents of the foregoing embodiments, wherein the same reference numeral is used to denote the same or similar elements and description of the same technical content is omitted. References may be made to the foregoing embodiments for the description of the omitted parts, which will not be reiterated in the following embodiments.

Figure 2:
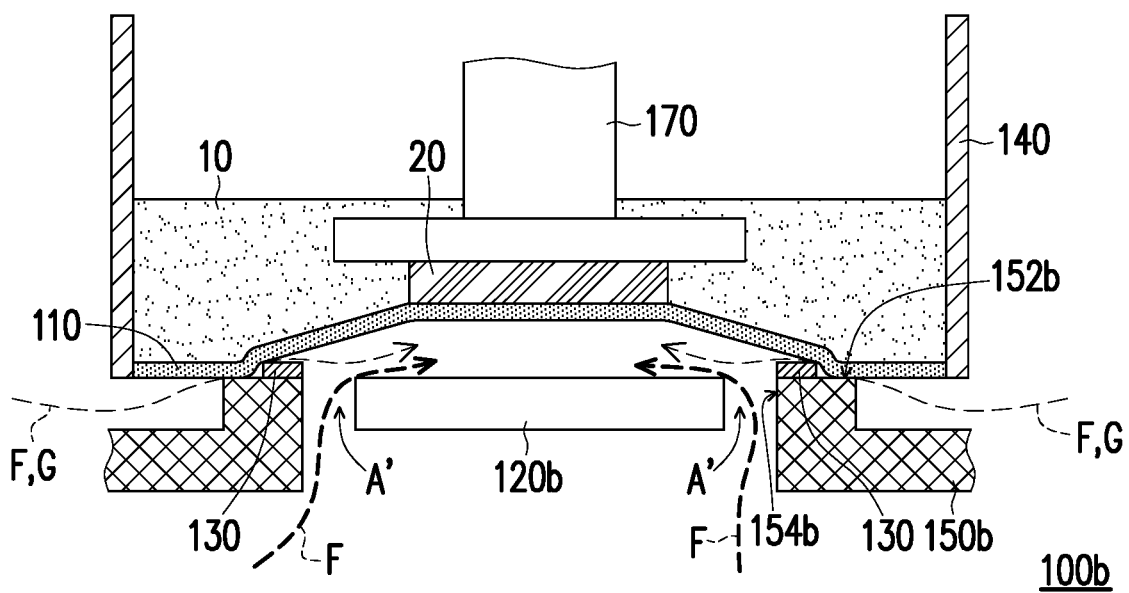
FIG. 2 is a schematic diagram of separating a workpiece in a tank of a three dimensional printing apparatus from a release film according to an embodiment of the disclosure.

FIG. 2 is a schematic diagram of separating a workpiece in a tank of a three dimensional printing apparatus from a release film according to an embodiment of the disclosure. Please refer to FIG. 1B and FIG. 2 at the same time. A three dimensional printing apparatus 100b of this embodiment is similar to the three dimensional printing apparatus 100a of FIG. 1B, with difference between the two being that a glass plate 120b of this embodiment is a glass plate without vias. In detail, the glass plate 120b of this embodiment is located in a groove 154b of a carrying plate 150b. A spacer 130 is disposed on a carrying surface 152b of the carrying plate 150b and is located between a release film 110 and a carrying plate 150b. There is an air space A' between the carrying plate 150b and the glass plate 120b. A fluid F is located between the release film 110 and the glass plate 120b by a gap G and the air space A' to break the vacuum or low pressure state between the release film 110 and the glass plate 120b, so that the release film 110 may be easily detached from the glass plate 120b.

Figure 3:
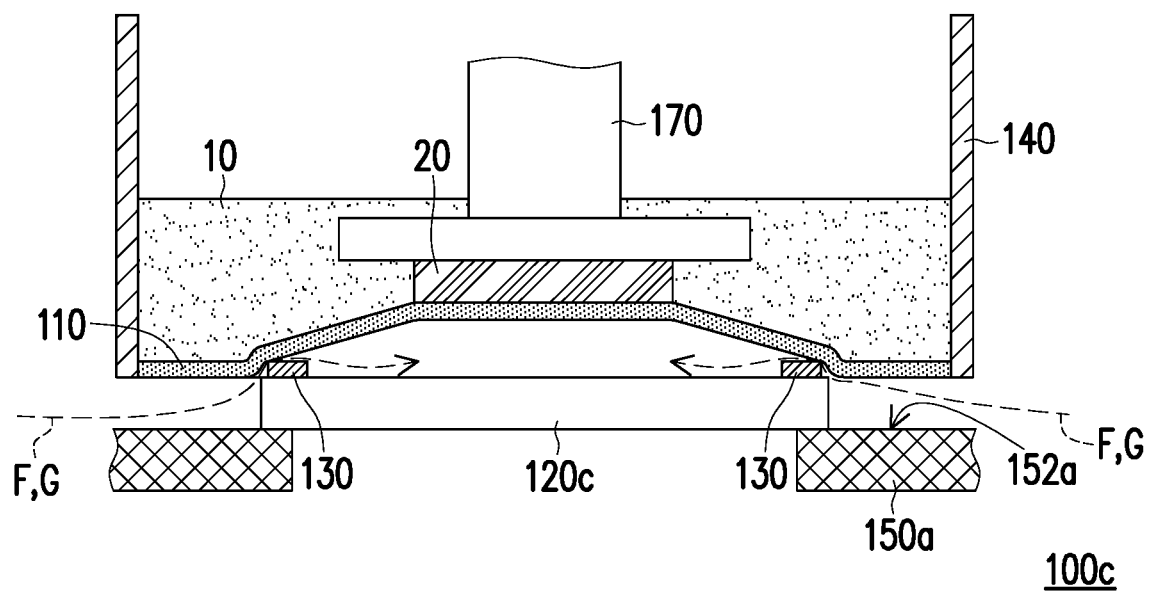
FIG. 3 is a schematic diagram of separating a workpiece in a tank of a three dimensional printing apparatus from a release film according to another embodiment of the disclosure.

FIG. 3 is a schematic diagram of separating a workpiece in a tank of a three dimensional printing apparatus from a release film according to another embodiment of the disclosure. Please refer to FIG. 1B and FIG. 3 at the same time. A three dimensional printing apparatus 100c of this embodiment is similar to the three dimensional printing apparatus 100a of FIG. 1B, with difference between the two being that a glass plate 120c of this embodiment is a glass plate without vias. In detail, the glass plate 120c of this embodiment is disposed on a carrying surface 152a of a carrying plate 150a. A spacer 130 is disposed on the glass plate 120c and is located between the glass plate 120c and a release film 110. A build platform 170 lifts a workpiece 20 upwards, so that a fluid F in an external space is located between the release film 110 and the glass plate 120c through a gap G, thereby breaking the vacuum or low pressure phenomenon between the release film 110 and the glass plate 120c, so as to balance the pressure on both sides of the release film 110.

In short, the three dimensional printing apparatus 100c of the embodiment allows the external fluid F to enter between the release film 110 and the glass plate 120c by setting the spacer 130 to break the vacuum or low pressure state between the release film 110 and the glass plate 120c, so that the release film 110 may be easily detached from the glass plate 120c.

Figure 4:
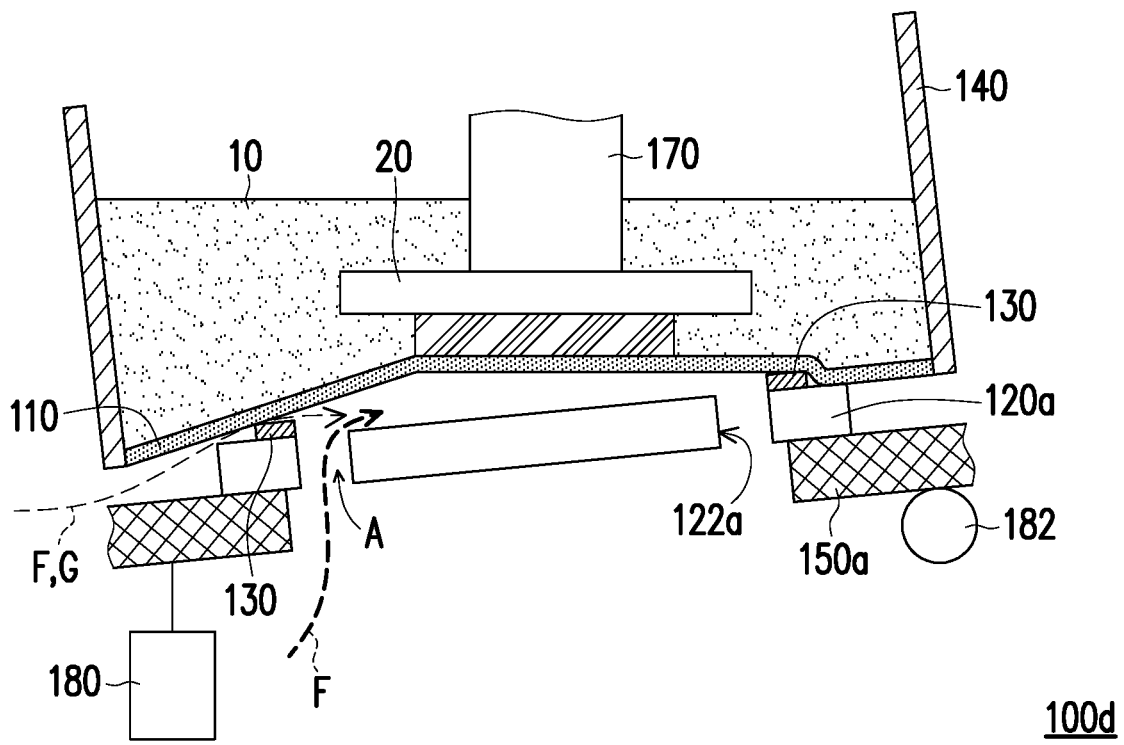
FIG. 4 is a schematic diagram of separating a workpiece in a tank of a three dimensional printing apparatus from a release film according to another embodiment of the disclosure.

FIG. 4 is a schematic diagram of separating a workpiece in a tank of a three dimensional printing apparatus from a release film according to another embodiment of the disclosure. Please refer to FIG. 1B and FIG. 4 at the same time. A three dimensional printing apparatus 100d of this embodiment is similar to the three dimensional printing apparatus 100a of FIG. 1B, with difference between the two being that the three dimensional printing apparatus 100d of this embodiment further includes a drive assembly 180 and a pivot 182. The drive assembly 180 is disposed on one side of a carrying plate 150a and the pivot 182 is disposed on the other side of the carrying plate 150a. When the drive assembly 180 pulls the carrying plate 150a such that a glass plate 120a drives a tank 140 to tilt, the glass plate 120a may drive the tank 140 to rotate along the pivot 182. In another embodiment, the carrying plate 150a and the tank 140 may be fixed together by means such as locking, buckling, adhering, etc. Therefore, when the drive assembly 180 pulls the carrying plate 150a, the tank 140 may be linked to tilt, which may belong to the protected scope of the disclosure. At this time, at least a part of the glass plate 120a is gradually separated from the release film 110 to generate a gap between the workpiece 20. A fluid F is located between the release film 110 and the glass plate 120a through a gap G and an air space A, thereby breaking the vacuum or low pressure phenomenon between the release film 110 and the glass plate 120a, so as to balance the pressure on both sides of the release film 110.

Since the three dimensional printing apparatus 100d of the embodiment achieves the separation of the workpiece 20 from the release film 110 by the spacer 130 and the drive assembly 180 at the same time, in addition to greatly reducing the peeling force required to separate the workpiece 20 from the release film 110 to avoid damaging the workpiece 20 and deforming the release film 110, when the workpiece 20 is lifted upwards, the workpiece 20 may also be separated from the release film 110 at a faster speed, thereby effectively reducing the time for forming the workpiece 20. Also, the yield of forming large-area workpieces will be greatly improved. In short, the three dimensional printing apparatus 100d of the embodiment not only improves release efficiency and shortens printing time, but also reduces peeling of the workpiece 20 in the positive direction to reduce the risk of tearing the workpiece 20, thereby increasing product yield.

Figure 5:
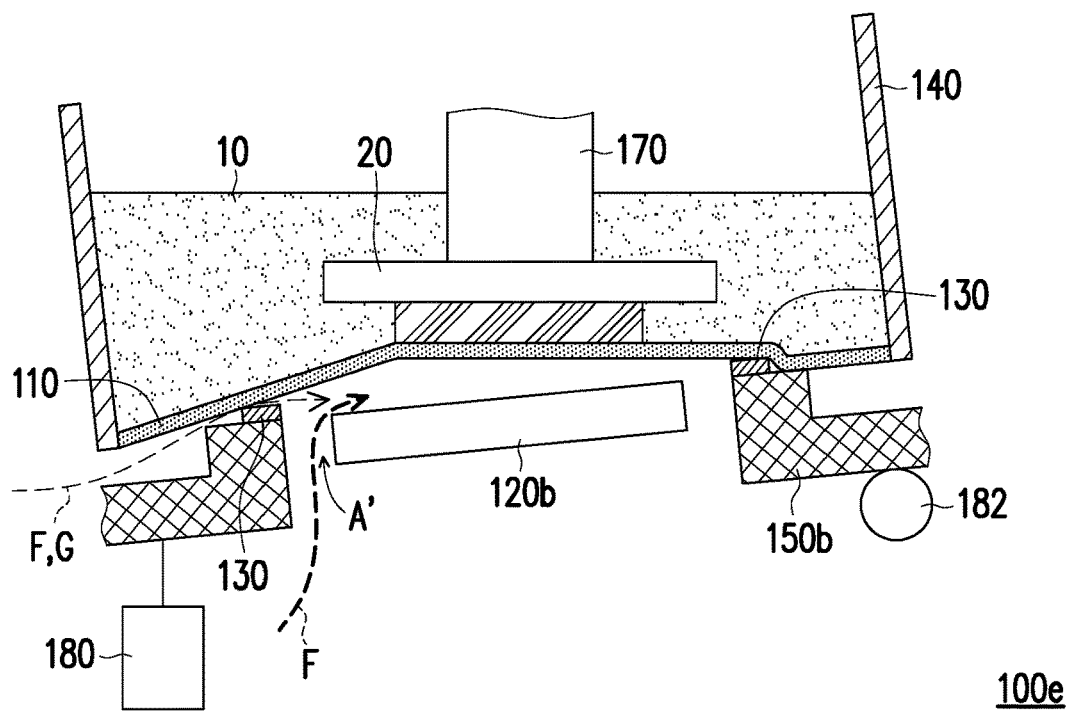
FIG. 5 is a schematic diagram of separating a workpiece in a tank of a three dimensional printing apparatus from a release film according to another embodiment of the disclosure.

FIG. 5 is a schematic diagram of separating a workpiece in a tank of a three dimensional printing apparatus from a release film according to another embodiment of the disclosure. Please refer to FIG. 2 and FIG. 5 at the same time. A three dimensional printing apparatus 100e of this embodiment is similar to the three dimensional printing apparatus 100b of FIG. 2, with difference between the two being that the three dimensional printing apparatus 100e of this embodiment further includes a drive assembly 180 and a pivot 182. The drive assembly 180 is disposed on one side of a carrying plate 150b and the pivot 182 is disposed on the other side of the carrying plate 150b. When the drive assembly 180 pulls the carrying plate 150b such that a glass plate 120b drives a tank 140 to tilt, the glass plate 120b may drive the tank 140 to rotate along the pivot 182. In another embodiment, the carrying plate 150b and the tank 140 may be fixed together by means such as locking, buckling, adhering, etc. Therefore, when the drive assembly 180 pulls the carrying plate 150b, the tank 140 may be linked to tilt, which may belong to the protected scope of the disclosure. At this time, at least a part of the glass plate 120b is gradually separated from a release film 110 to generate a gap between a workpiece 20. A fluid F is located between the release film 110 and the glass plate 120b through a gap G and an air space A', thereby breaking the vacuum or low pressure phenomenon between the release film 110 and the glass plate 120b, so as to balance the pressure on both sides of the release film 110.

Figure 6:
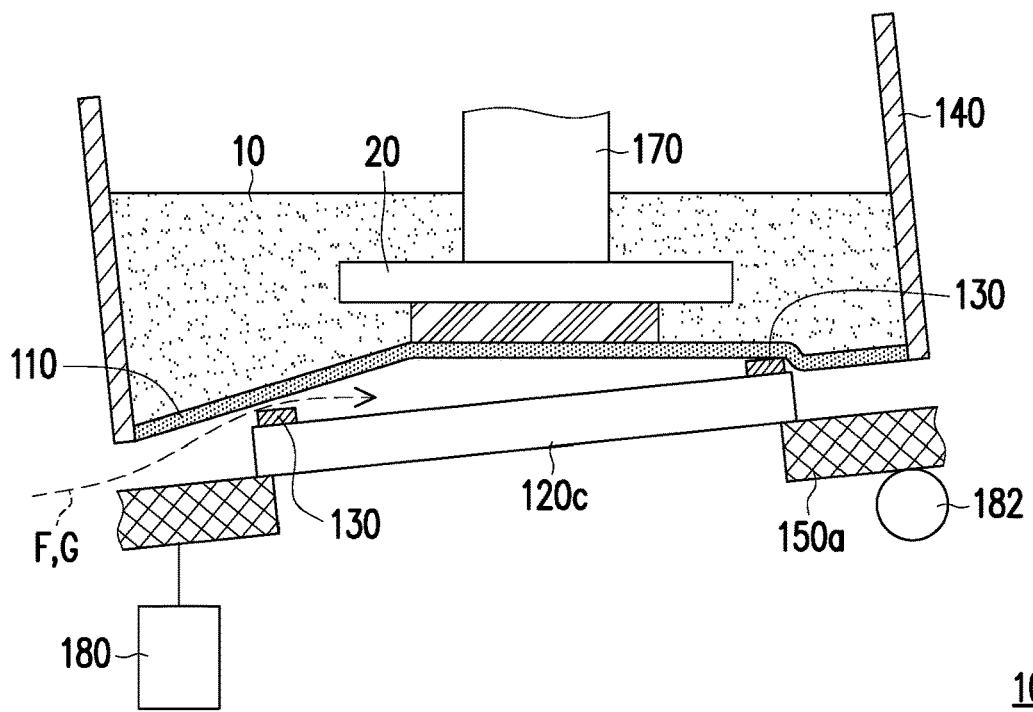
FIG. 6 is a schematic diagram of separating a workpiece in a tank of a three dimensional printing apparatus from a release film according to another embodiment of the disclosure.

FIG. 6 is a schematic diagram of separating a workpiece in a tank of a three dimensional printing apparatus from a release film according to another embodiment of the disclosure. Please refer to FIG. 3 and FIG. 6 at the same time. A three dimensional printing apparatus 100f of this embodiment is similar to the three dimensional printing apparatus 100c of FIG. 3, with difference between the two being that the three dimensional printing apparatus 100f of this embodiment further includes a drive assembly 180 and a pivot 182. The drive assembly 180 is disposed on one side of the carrying plate 150a and the pivot 182 is disposed on the other side of the carrying plate 150a. When the drive assembly 180 pulls the carrying plate 150a such that a glass plate 120c drives a tank 140 to tilt, the glass plate 120c may drive the tank 140 to rotate along the pivot 182. In another embodiment, the carrying plate 150a and the tank 140 may be fixed together by means such as locking, buckling, adhering, etc. Therefore, when the drive assembly 180 pulls the carrying plate 150a, the tank 140 may be linked to tilt, which may belong to the protected scope of the disclosure. At this time, at least a part of the glass plate 120c is gradually separated from the release film 110 to generate a gap between a workpiece 20. A fluid F is located between the release film 110 and the glass plate 120c through a gap G, thereby breaking the vacuum or low pressure phenomenon between the release film 110 and the glass plate 120c, so as to balance the pressure on both sides of the release film 110.

It is worth mentioning that the drive assembly 180 is, for example, a stepper motor, a voice coil motor, or a spring or a piezoelectric material for achieving the same effect as a motor, but the disclosure is not limited thereto. In addition, the fluid F may be a gas, such as air, nitrogen, or other various gases commonly used in process technology. Of course, the fluid F may also be replaced with a liquid, such as water, as required. All of the above belongs to the protected scope of the disclosure.

Based on the above, in the design of the three dimensional printing apparatus according to the embodiments of the disclosure, the interface between the transparent plate and the elastic film may be in communication with the external space through the fluid channel between the bump and the elastic film. That is, the three dimensional printing apparatus according to the embodiments of the disclosure allows the external fluid to enter between the elastic film and the transparent plate by setting the bump, so as to break the vacuum or low pressure state between the elastic film and the transparent plate, so that the elastic film may be easily detached from the transparent plate.

Although the disclosure has been disclosed in the above embodiments, the embodiments are not intended to limit the disclosure. It will be apparent to persons skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A three dimensional printing apparatus, comprising:
   a carrying plate;
   an elastic film disposed on the carrying plate;
   a transparent plate disposed under the elastic film; and
   a bump disposed between the elastic film and the carrying plate, wherein an interface between the transparent plate and the elastic film is capable of communicating with an external space through a fluid channel between the bump and the elastic film, and an orthographic projection area of the bump on the transparent plate is not more than ¼ of a surface area of the transparent plate,
   wherein the transparent plate has a plurality of vias, an air space exists between the carrying plate and the plurality of vias of the transparent plate, and the fluid channel and the air space allow a fluid to pass through.

2. The three dimensional printing apparatus according to claim 1, wherein the bump is a spacer, and the fluid channel is a gap between the transparent plate and the elastic film.

3. The three dimensional printing apparatus according to claim 1, wherein the transparent plate is a glass plate, and the elastic film is a release film.

4. The three dimensional printing apparatus according to claim 3, wherein the glass plate is disposed on a carrying surface of the carrying plate, and the spacer is disposed on the glass plate and located between the glass plate and the release film.

5. The three dimensional printing apparatus according to claim 3, wherein the glass plate is located in a groove of the carrying plate, the spacer is disposed on a carrying surface of the carrying plate and is located between the release film and the carrying plate.

6. The three dimensional printing apparatus according to claim 3, further comprising:
   a tank disposed on the glass plate, wherein the release film is located between the glass plate and the tank.

7. The three dimensional printing apparatus according to claim 6, further comprising:
   a drive assembly disposed on a side of the carrying plate; and
   a pivot disposed on another side of the carrying plate.

8. The three dimensional printing apparatus according to claim 2, wherein a material of the spacer comprises one of the following material: polyethylene terephthalate, urethane, aluminum and steel.

9. The three dimensional printing apparatus according to claim 1, wherein the bump comprises a plurality of bumps separated from one another.

10. The three dimensional printing apparatus according to claim 1, further comprising:
    a projector disposed on an upstream of a light path of the transparent plate and suitable for providing a light beam towards the transparent plate, wherein the bump is a spacer, and the spacer is located outside a projection range of the projector.

11. The three dimensional printing apparatus according to claim 10, wherein the transparent plate is a glass plate, and the elastic film is a release film.

12. The three dimensional printing apparatus according to claim 11, wherein the glass plate is disposed on a carrying surface of the carrying plate, and the spacer is disposed on the glass plate and located between the glass plate and the release film.

13. The three dimensional printing apparatus according to claim 11, wherein the glass plate is located in a groove of the carrying plate, the spacer is disposed on a carrying surface of the carrying plate and is located between the release film and the carrying plate.

14. The three dimensional printing apparatus according to claim 11, further comprising:
    a tank disposed on the glass plate, wherein the release film is located between the glass plate and the tank.

15. The three dimensional printing apparatus according to claim 14, further comprising:
    a drive assembly disposed on a side of the carrying plate; and
    a pivot disposed on another side of the carrying plate.

16. The three dimensional printing apparatus according to claim 10, wherein a material of the spacer comprises one of the following materials: polyethylene terephthalate, urethane, aluminum and steel.

17. The three dimensional printing apparatus according to claim 10, wherein the spacer comprises a plurality of spacers separated from one another.

* * * * *